(12) United States Patent
Singh

(10) Patent No.: US 9,805,015 B2
(45) Date of Patent: Oct. 31, 2017

(54) SYSTEM AND METHOD FOR ENHANCED USER INTERACTIONS WITH A GRID

(75) Inventor: Mona Singh, Cary, NC (US)

(73) Assignee: Teradata US, Inc., Dayton, OH (US)

( * ) Notice: Subject to any disclaimer, the term of this patent is extended or adjusted under 35 U.S.C. 154(b) by 439 days.

(21) Appl. No.: 12/639,682

(22) Filed: Dec. 16, 2009

(65) Prior Publication Data

US 2011/0145297 A1 Jun. 16, 2011

(51) Int. Cl.
*G06F 17/24* (2006.01)
*G06F 17/30* (2006.01)

(52) U.S. Cl.
CPC ...... *G06F 17/246* (2013.01); *G06F 17/30572* (2013.01)

(58) Field of Classification Search
CPC .................................................. G06F 17/246
USPC ........... 715/205, 212, 236, 747, 810; 725/45
See application file for complete search history.

(56) References Cited

U.S. PATENT DOCUMENTS

| | | | | |
|---|---|---|---|---|
| 6,167,523 | A * | 12/2000 | Strong | 726/21 |
| 6,526,399 | B1 * | 2/2003 | Coulson et al. | |
| 6,766,509 | B1 * | 7/2004 | Sheretov et al. | 717/125 |
| 7,318,192 | B1 * | 1/2008 | Hobbs et al. | 715/212 |
| 7,379,908 | B2 * | 5/2008 | Clancey et al. | 705/35 |
| 7,559,028 | B2 * | 7/2009 | Yung | 715/745 |
| 7,730,096 | B2 * | 6/2010 | Edwy et al. | 707/793 |
| 7,885,981 | B2 * | 2/2011 | Kaufman et al. | 707/802 |
| 8,161,081 | B2 * | 4/2012 | Kaufman et al. | 707/802 |
| 2004/0073921 | A1 | 4/2004 | Neely et al. | |
| 2005/0060317 | A1 * | 3/2005 | Lott et al. | 707/10 |
| 2006/0004793 | A1 * | 1/2006 | Edwy et al. | 707/100 |
| 2006/0161866 | A1 | 7/2006 | Sloo et al. | |
| 2006/0253775 | A1 | 11/2006 | Ovetchkine et al. | |
| 2007/0100967 | A1 * | 5/2007 | Smith et al. | 709/219 |
| 2007/0130502 | A1 | 6/2007 | Tolgu et al. | |
| 2007/0173305 | A1 * | 7/2007 | Chen et al. | 463/9 |
| 2007/0186156 | A1 * | 8/2007 | Bagare et al. | 715/523 |
| 2007/0245247 | A1 | 10/2007 | Neely et al. | |
| 2008/0046462 | A1 * | 2/2008 | Kaufman et al. | 707/102 |
| 2009/0313201 | A1 * | 12/2009 | Huelsman et al. | 706/47 |
| 2010/0241516 | A1 * | 9/2010 | Kim et al. | 705/14.73 |
| 2011/0191303 | A1 * | 8/2011 | Kaufman et al. | 707/684 |

OTHER PUBLICATIONS

Microsoft® Office Excel 2007 on Demand by: Steve Johnson, (Que Pub. Dec. 8, 2006) See pp. 37, 116, 117, 298.*

\* cited by examiner

*Primary Examiner* — William Bashore
*Assistant Examiner* — Nathan Shrewsbury
(74) *Attorney, Agent, or Firm* — Schwegman, Lundberg & Woessner, P.A.; Randy L. Campbell, Jr.

(57) ABSTRACT

Methods and systems that implement enhanced user interactions with a grid are described. A method may include generating a grid of cells arranged in a number of rows and columns. Each row may correspond to a data record of a database. The grid may be displayed to a user while identifying one or more cells as editable cells. Input data may be received from the user for each of the editable cells. The input data may be validated using predefined criteria to identify incorrect input data and errors associated with the incorrect input data may be displayed to the user. Additional methods and systems are disclosed.

17 Claims, 7 Drawing Sheets

GRID SHOWING EDITABLE CELLS

| RELEASE PRODUCTS | | DESCRIPTION ▽ | DATE | COMPONENT TYPE ▽ | COLUMN 5 | CUSTOMIZE COLUMNS ▽ | ⇗ EXPORT | COLUMN 6 ▽ |
|---|---|---|---|---|---|---|---|---|
| ☐ | NAME 1 | DESCRIPTION FOR NAME 1 | 2/3/2009 | COMPONENT TYPE DESCRIPTION | COMPONENT TYPE DESCRIPTION | | | 123 |
| ☐ | NAME 2 | DESCRIPTION FOR NAME 2 | 2/3/2009 | COMPONENT TYPE DESCRIPTION | COMPONENT TYPE DESCRIPTION | | | 987 |
| ☐ | NAME 3 | DESCRIPTION FOR NAME 3 | 2/23/2009 | COMPONENT TYPE DESCRIPTION | COMPONENT TYPE DESCRIPTION | | | 12230 |

Fig. 4

ROW WITH EDITABLE CELLS SELECTED

| RELEASE PRODUCTS | | | | CUSTOMIZE COLUMNS | | EXPORT | |
|---|---|---|---|---|---|---|---|
| ☐ | NAME ▽ | DESCRIPTION ▽ | DATE | COMPONENT TYPE ▽ | COLUMN 5 | COLUMN 6 ▽ | |
| ☐ | NAME 1 | DESCRIPTION FOR NAME 1 | 2/3/2009 | COMPONENT TYPE DESCRIPTION | COMPONENT TYPE DESCRIPTION DESCRIPTION FOR DISPLAY | 123 | |
| ☐ | NAME 2 | DESCRIPTION FOR NAME 2 | 2/3/2009 | COMPONENT TYPE DESCRIPTION | COMPONENT TYPE DESCRIPTION | WHATEVER OPTION | |
| ☐ | NAME 3 | DESCRIPTION FOR NAME 3 | 2/23/2009 | COMPONENT TYPE DESCRIPTION | COMPONENT TYPE DESCRIPTION | 12230 | |

WHAT THIS MEANS: COMPONENT TYPE DESCRIPTION

SYSTEM AND METHOD FOR ENHANCED USER INTERACTIONS WITH A GRID

BACKGROUND

An effective Demand Chain Management (DCM) can reverse the flow of information in the traditional supply chain. For example, DCM can pull information about demand at the store and Stock Keeping Unit (SKU) level, up through the chain, to vendors and manufacturers, thereby eliminating out of stocks and deducing inventory carrying costs.

DCM systems may use relational databases for online transactional processing (OLTP). Traditionally, data retrieved from the databases are displayed to users via forms specifically designed for each application. Forms may also be used to gather information relating to application data from the users. More efficient approaches for displaying data and facilitating user interactions with the data sources would be beneficial.

BRIEF DESCRIPTION OF THE DRAWINGS

Some embodiments of the disclosed technology are illustrated by way of example and not limitation in the figures of the accompanying drawings in which:

FIG. 4 is a screen shot illustrating a grid providing enhanced user interactions with the grid, according to various embodiments;

FIG. 5 is a screen shot illustrating a grid providing further enhanced user interactions with the grid, according to various embodiments;

FIG. 6 is a screen shot of a page for searching one more data sources using filter criteria, according to various embodiments.

DETAILED DESCRIPTION

Figure 1:
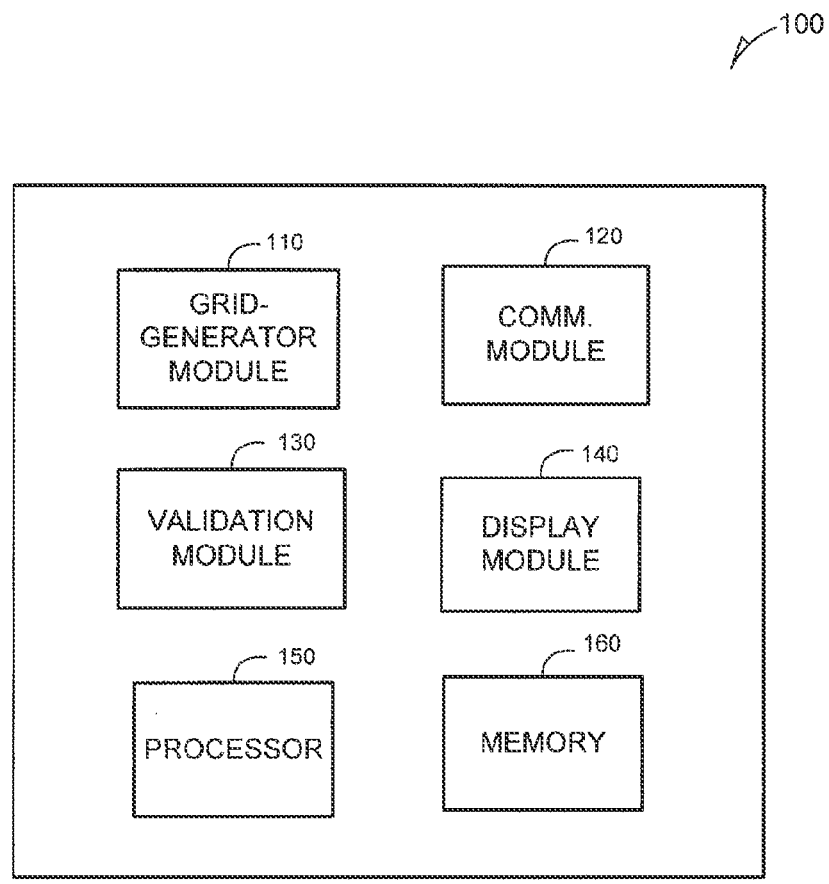
FIG. 1 illustrates a system for implementing enhanced user interactions with a grid, according to various embodiments.

Example methods and systems that implement enhanced user interactions with a grid will now be described. In the following description, numerous examples having example-specific details are set forth to provide an understanding of example embodiments. It will be evident, however, to one of ordinary skill in the art, after reading this disclosure, that the present examples may be practiced without these example-specific details, and/or with different combinations of the details than are given here. Thus, specific embodiments of the invention are given for the purpose of simplified explanation, and not limitation.

Some embodiments described herein include generating a grid of cells arranged in a number of rows and columns. Each row may correspond to a data record of a database. The grid may be displayed to a user while identifying one or more cells as editable cells. Input data may be received from the user for each of the editable cells. The input data may be validated using predefined criteria to identify incorrect input data and errors associated with the incorrect input data may be displayed to the user.

Grid (tabular) representation of data retrieved from one or more databases may provide a preferred method of displaying the retrieved data to users requesting such data. The grid representation may also enhance user interactions with the grid. Example grids disclosed herein may allow the user to edit cells of the grid by providing input data (e.g., new data or modification of data displayed in the cell). Such modifications of displayed data are traditionally received via separate forms provided in non-grid formats.

The input data for a cell of the grid may be validated using predefined criteria. The predefine criteria may include, formatting information such as character type (e.g., numeric), an expected type of input data (e.g., a name, a date, an amount, an address, a phone number, a percentage value, and the like), a range of accepted values (e.g., 0-100 for a percentage, 40-120 for a temperature range, or 100-10000 for a number of an item ordered), and so forth.

The grid representations described herein also offers the benefit of providing additional information related to data content of some cells of the grid. Such information may routinely be provided to the user via additional forms. The enhancement in user interactions with the grid as described herein, includes providing the additional information contextual to the grid, rather than in separate forms. The additional information is merely provided in a cell of the grid when the cell is being edited and is not otherwise visible in the grid. In a preferred embodiment, the grid representations may be implemented via Web applications provided to clients via Web interfaces. The grid representations may, in some embodiments, be implemented via client applications installed on a client machine such as a machine 700 shown in FIG. 7. The Web applications may be supported by a system 100 shown in FIG. 1 and described below.

FIG. 1 illustrates a system 100 for implementing enhanced user interactions with a grid, according to various embodiments. The system 100 supports a web client application involving a grid (e.g., a grid 400 shown in FIG. 4). The system 100 may comprise a grid generator module 110, a communication module 120, a validation module 130, a display module 140, a processor 150 and the memory 160. The grid generator module 110, the communication module 120, the validation module 130, and the display module 140 may comprise software modules that are implemented by the processor 150 or a processor 760 of FIG. 7. The display module 140 may interact with a display unit 710 shown in FIG. 7 to perform the tasks described herein for the display module 140.

In an example embodiment, the grid generator module 110 may generate a grid, such as the grid 400 of FIG. 4, having multiple cells arranged in columns and rows. The grid may represent information corresponding to a set of data stored in the memory 160. The set of data may comprise data retrieved from one or more databases retained in a main memory 770, a static memory 780, a machine-readable medium 722, all of FIG. 7. The database may comprise a relational database storing information related various kinds of businesses of an entity. The entity may, for example, be a chain store dealing with a variety of items.

The display module 140 may display the grid to a user. The display module 140 may identify a number of cells of the grid as editable. In example embodiments, the user of the grid may be an employee of the entity using the grid to perform one or more specific actions such as checking on the inventory of certain items or ordering new items. Each grid row may represent a record of the data retrieved from a data source such as the data sources shown in column 655 shown in FIG. 6.

Grid columns may represent categories of data, for instance, description, date, component type, and the like. In preferred embodiments, the editable cells may comprise cells that the user may modify. The displayed grid may have default column titles. In example embodiments, the user may be allowed to edit the column title or add new columns with proposed titles. The new columns may be added after (to the right of) the last column or in between the existing grid columns. The user may also be allowed to add new rows to the grid. The new rows may be added right below the last row or in between the exiting grid rows.

The communication module 120 may receive user input data (e.g., new data or modification of the data displayed in the editable cells) for one or more of the editable cells. The input data may be passed to the validation module 130, where first, a criticality level of the input data is determined. The criticality level is determined based on factors defined by the user, a business owner, or an employee of the business owner. Some data items may be decisive for the business, so that errors in those data items may not be acceptable. For the decisive data items, the validation of the input data is performed to identify incorrect input data (e.g., input data that are not valid based on the predefined criteria.)

When the validation module 130 determines that the content of that cell is critical to business, the validation module 130 may validate the input data received from the user for a specific cell of the grid. For example, when a store manager enters an input data (e.g., a number) in a grid cell in a grid column that relates to a number of lots (e.g., large bundles) of an item or a dollar amount in units of $100K the validation module 130 may consider that input data critical and validates the entered number.

The validation may be based on one or more predefined criteria. For instance, the business owner may have set certain limits such as a range of values for a category represented by a grid title such as a number of lots. For example, the business owner may not want to allow the number of lots of jeans ordered from a manufacturer exceeds 100 lots, or the amount of each money transfer between certain accounts by an employee exceeds $1M. In such cases, the validation module 130 may identify the incorrect input data (e.g., input data that is not within the set range) and instruct the display module 140 to display the errors associated with the incorrect input data. For instance, the display module 140 may identify the grid cell with incorrect data input with a different text color such as red and/or display an additional message indicating to the user an acceptable range of values for that input data.

Figure 2:
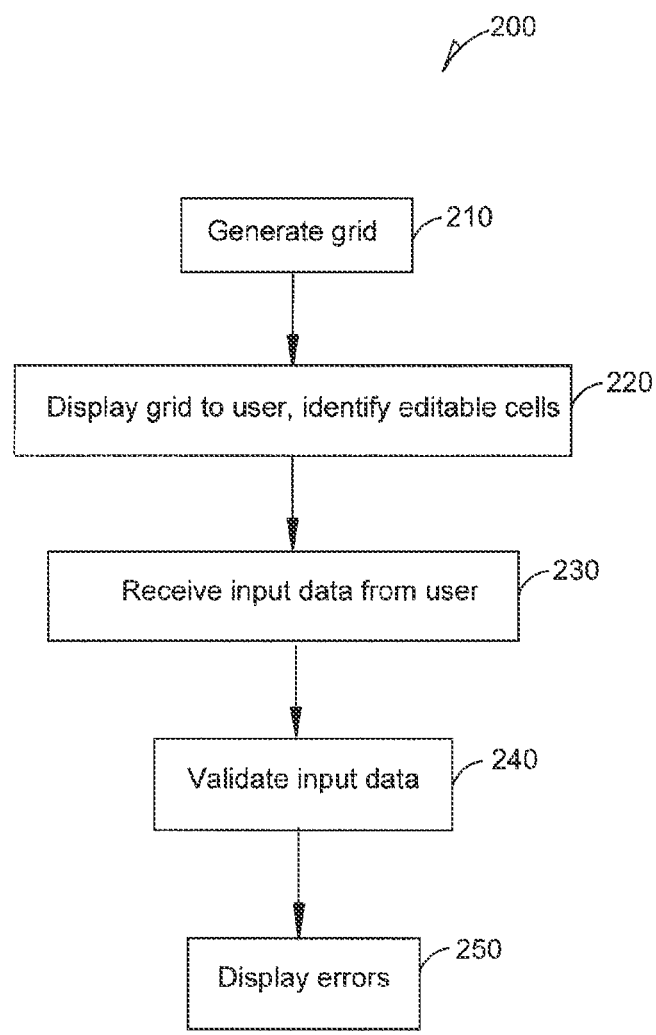
FIG. 2 is a flow diagram illustrating a method of implementing enhanced user interactions with a grid, according to various embodiments.

FIG. 2 is a flow diagram illustrating a method 200 of implementing enhanced user interactions with a grid, according to various embodiments. The method 200 may start at operation 210, where the grid generator module 110 of FIG. 1 may generate a grid having a number of cells arranged in multiple columns and rows. The display module 140 OF FIG. 1 may, at operation 220, send instructions to display unit 710 of FIG. 7 to display the grid to a user. The display module 140 may identify one or more cells of the grid as editable cells. For example, the pen icons 325 in FIG. 3 indicate that the cells of the row marked by the pen icon are editable.

At operation 230, the communication module 120 of FIG. 1 may receive input data from the user for one or more editable cells. The user may for example be a secretary of a firm who is using a grid to order lunch for a meeting. A meal order grid may have columns entitled "Name", "Meal", "Beverage", and "Other." The meal order grid may be coupled to the data sources such as employee data source and restaurant data sources of a database. Grid rows of the meal order grid comprises selections of meals, beverages and others (e.g., salads. snacks and the like) for employees attending the meeting. The secretary may enter name of a restaurant and the prospective meeting attendees' names in the meal order grid and let the rest of the cells to be filled by the prospective meeting attendees.

In an embodiment, the cells of the meal grid under all columns may comprise drop-down list boxes and allow the prospective employee to select from the list of meals, beverages and others provided by the corresponding drop-down list. In this scenario, the input data received by the communication module 120 is not sent for validation by the validation module 130 of FIG. 1. In another embodiment, some of cells under of the meal order grid may be automatically filled by the grid generator module 110 of FIG. 1 based on the existing data in the employee data source and the data source of the restaurant.

For instance, for some employees the beverage and other cells may be preselected by the grid generator module 110 based on preferred selections of those employees retrieved from the employee data source. As for the editable cells, a prospective meeting attendee may enter a value (an input data) for meal selection that is not consistent with the meals offered by that restaurant.

At operation 240, the validation module 130 validates the entered input data and identifies it as incorrect. In response to the identification, the display module 140, at operation 250, may display the error by, for example, an error signal, such as a red frame around the corresponding cell. The display module 140 may show a message in the corresponding cell indicating one or more acceptable choices for the value of the meal selection (acceptable input data). The message may be displayed in other ways, such as in the form of a pop-up window. Further detail of the above operations is given with respect to the flow graph shown in FIG. 3 and described below.

Figure 3:
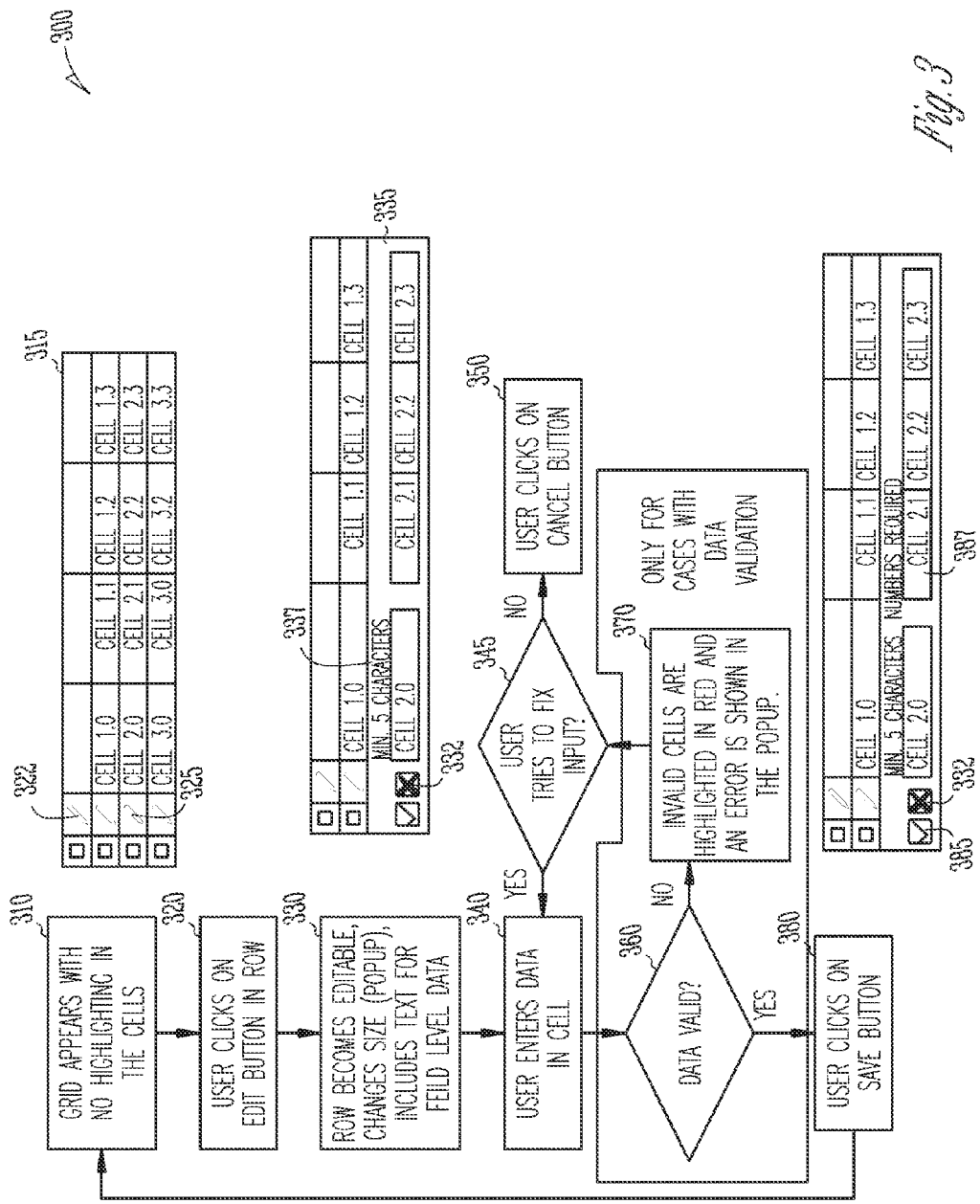
FIG. 3 is a flow diagram illustrating a method of implementing enhanced user interactions with a grid, according to various embodiments.

FIG. 3 is a flow diagram illustrating a method 300 of implementing enhanced user interactions with a grid, according to various embodiments. At operation 310, a grid 315 generated by the grid generator module 110 of FIG. 1 is displayed by the display module 140 of FIG. 1 to a user. The grid 315 shows pen icons such as a pen icon 325 in front of three rows of the grid 315. The pen icons 325 allow the user to make a row editable by activating the pen icon 325 (e.g., by clicking, mouse over, or the like). As seen from FIG. 3, no cells of the grid 315 are highlighted.

At operation 320, the user activates the pen icon 325. In response, the grid generator module 110, at operation 330, generates a new appearance for the row 335 and causes the display module 140 to display the new appearance with highlighting and change of size (pop-up) as shown in row 335. Further, for one or more of the cells of the row 335, additional information 337 (e.g., "min 5 characters") may be shown as an editing guide for the user. The additional information may not be visible in the grid in normal operation of the grid. In an embodiment, the edit-all pen icon 322 may be activated by the user to make the entire cells of the grid 315 editable.

At operation 340, the user may enter input data in the highlighted editable cells. At this point, if the validation module 130 of FIG. 1 (decision block 360) finds the input data valid, at operation 380 the user may click the save button 385 to save the grid. In embodiments, the input data may be automatically saved when the input data is found to be valid by the validation module 130. Otherwise, at operation 370, the input data may in cells for which invalid input data has been entered maybe highlighted in red (see cell 387). Then, the user may decide to fix or cancel the incorrect input data (operation 345). At Operation 350, if the user decides not to fix the incorrect input data, the user may activate the cancel button 332 to withdraw the incorrect input data. Otherwise, the user may, at operation 340, enter a new input data in the cell.

FIG. 4 is a screen shot illustrating a grid 400 providing enhanced user interactions with the grid, according to various embodiments. The grid 400 comprises columns 410, 420 and 430 with preset titles as shown in FIG. 4. The names in cells 460, 470, and 480 may represent the names of the released products, for which records of data are stored or will be stored in a released product data source of a database. A user may make a particular cell of column 440 editable by simply clicking on that particular cell. The display module 140 of FIG. 1 may then make the editable cells highlighted. The user may activate the "Customize Column" tab 405, for example, to specify a column name for the column entitled column 5 or request sorting of the columns of the grid 400 that may result in a change of the location of the column 5 within the grid 400. In column 450, the cell 475 is also editable and is highlighted by the display module 140.

In example embodiments, the user may be allowed to add one or more new columns or new rows to the grid 400. The user may insert the new columns or rows at desired locations in the grid (e.g., before or after an identified column or row, respectively). In embodiments, the grid generator module 110 of FIG. 1 may automatically sort columns and rows of the grid after a new column is created. The grid generator module 110 may also change the order of columns or rows of the grid 400 in response to an action by the user. For example, the user may be allowed to select an entire column or row and move it to a desired location.

The grid 400 may also include hidden columns (for example, due to insufficient visible width of the page in view). The existence of hidden columns may be indicated to the user in many ways. For instance, the line between two columns may be highlighted to indicate that there exist hidden columns between those two columns. The display module 140 may display the hidden columns in response to an action by the user, for instance, clicking on the highlighted line. In an another embodiment, the name of the hidden columns may be given in a text box and a "Show hidden columns" button may be provided for the user to click on, when the user is ready to view/edit cells of the one or more hidden columns.

FIG. 5 is a screen shot illustrating a grid 500 providing further enhanced user interactions with the grid, according to various embodiments. The enhanced user interactions in grid 500 is provided through various features, as shown in FIG. 5. For example, additional information 515 shown on the top of the highlighted editable cells 510, 520 and 530 may guide the user by providing hints with respect to expected input data for these cells. In the editable cell 520, the shown drop-down list allows the user to select from a number of options provided by the list an input data for the editable cell 520.

The editable cell 530 may not be part of the grid, but is shown to receive additional input data related to row 505. Such additional data may traditionally be received via supplementary forms filled by the user. The provisioning of the editable cell 530, instead of the supplementary may make the interaction of the user with the grid more convenient. The additional input data received from the cell 530 may be stored in a corresponding data source retaining the data record associated with the row 530. The additional input data may become part of the grid 500 or be used in another grid serving a future user application.

Figure 6:
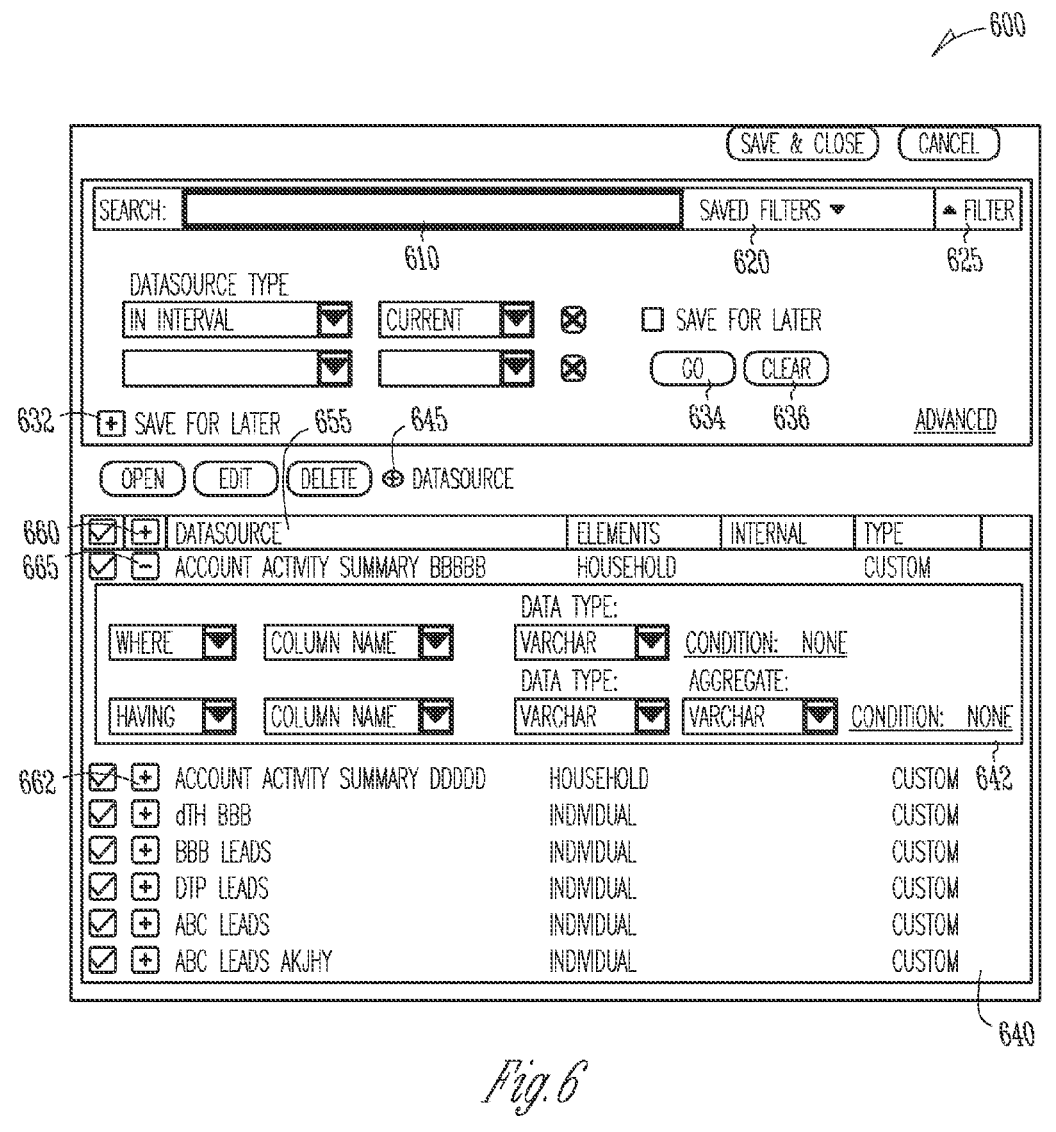
Figure 7:
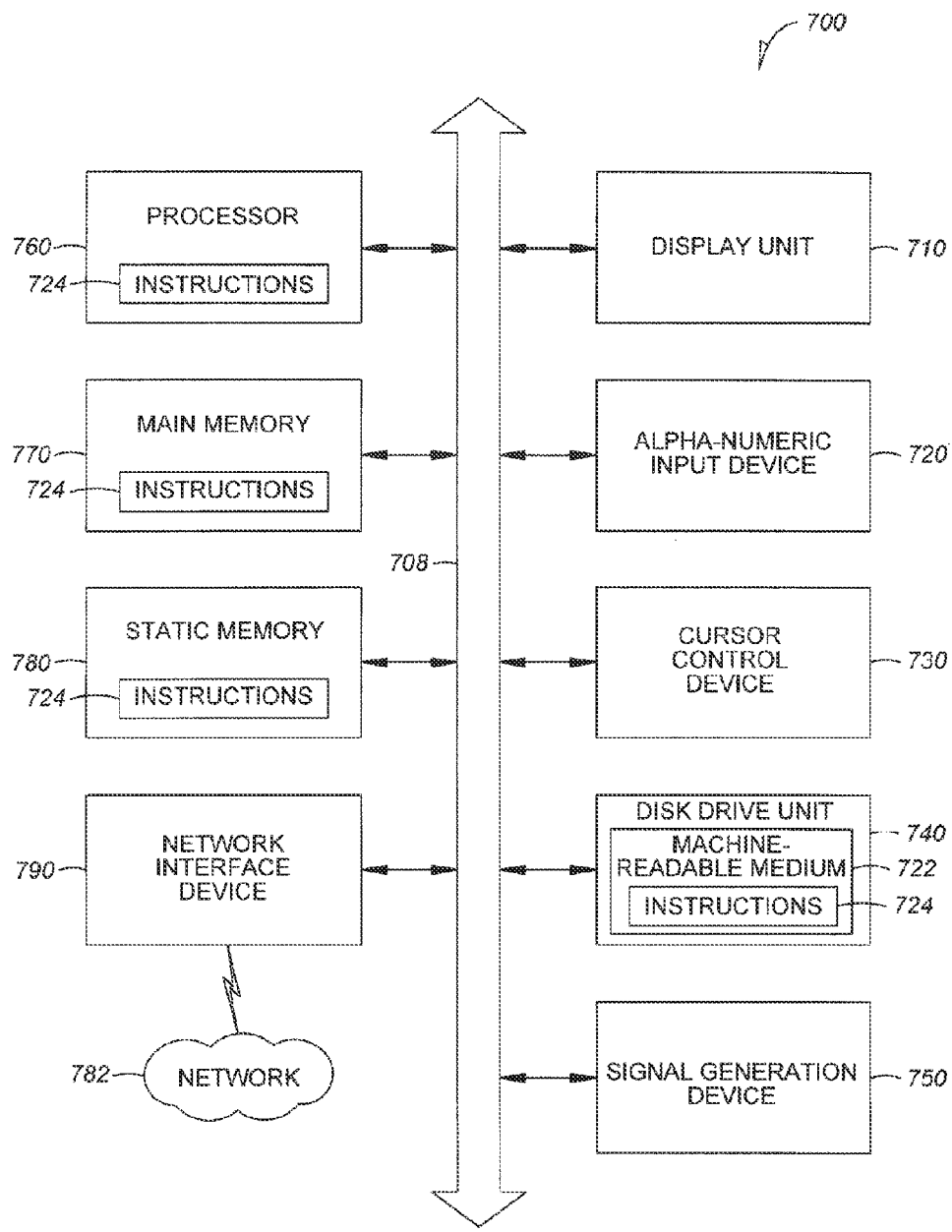
FIG. 7 is a block diagram of a machine, according to various embodiments.

The data sources used in generating grids described above are stored in a database retained partially/fully in the memory 160 of FIG. 1, the main memory 770, the static memory 780, or the disk drive unit 740, all of FIG. 7. The user may search for one or more data sources that are of interest to the user by searching the database using the page 600 shown in FIG. 6 and described below.

FIG. 6 is a screen shot of a page 600 for searching one more data sources using filter criteria, according to various embodiments. A user, may initiate a search by entering a criterion (e.g., a keyword) in the search box 610. The user may create a new filter to further refine the search criteria by activating the filter tab 625 to open the filter section 630, where the names of some columns of the data source can be selected from the drop-down boxes shown in filter section 630. The user may activate the button 632 to add more filter criteria and activate the "Go" button 634, or cancel the selections using the "Clear" button 636. In an embodiment, the user may use a saved filter by activating the saved filters drop-down 620. Search results may be shown a window 640, where the names of the retrieved data sources are given in column 655.

Expand buttons 660 or 662 may respectively be used to expand all or a specific data source to see an expanded form 642. The expanded form 642 shows cells with drop-down lists that allow the user to select column names, data type and other information for a new grid to be generated using the corresponding data source (e.g., "Account Activity Summary BBBBB" data source). The expanded form 642 may be closed by activating a close button 665. The cells in the expanded form 642 are not visible in the grid that may be generated based on the corresponding data source. The add data source button 645 may be used to open a form that allows the user to add new data sources to the listed data sources in the 640 box. Other tabs and tools shown in FIG. 6 are considered self explanatory and are not described herein. The grids discussed above with respect to FIGS. 3-6 may be generated, displayed and have their enhanced features performed using a machine 700 shown in FIG. 7 and described below.

FIG. 7 is a block diagram of a machine 700, according to various embodiments. The machine 700 may comprise a set of instructions that can be executed to cause the machine 700 to perform any one or more of the methodologies discussed herein. In alternative embodiments, the machine 700 may operate as a standalone device or may be connected (e.g., networked) to other systems. In a networked deployment, the machine 700 may operate in the capacity of a server or a client system in a server-client network environment or as a peer system in a peer-to-peer (or distributed) network environment. Machine 700 may be realized as a specific machine in the form of a computer, comprising a system similar to or identical to the system 100 of FIG. 1. Further, any of the elements of machine 700 (e.g., the processor 760 or the main memory 770, among others) may be included in the system 100.

The machine 700 may comprise a server computer, a client computer, a personal computer (PC), a tablet PC, an integrated circuit, an asynchronous FPGA, or any system capable of executing a set of instructions (sequential or otherwise) that specify actions to be taken by that system. Further, while only a single machine is illustrated, the term "machine" shall also be taken to include any collection of systems that individually or jointly execute a set (or multiple sets) of instructions to perform any one or more of the methodologies discussed herein.

The example machine 700 may include a processor 760 (e.g., a central processing unit (CPU), a graphics processing unit (GPU) or both), a main memory 770 and a static memory 780, all of which communicate with each other via a bus 708. The machine 700 may further include a display unit 710 (e.g., a liquid crystal display (LCD) or cathode ray tube (CRT)). The machine 700 also may include an alphanumeric input device 720 (e.g., a keyboard), a cursor control device 730 (e.g., a mouse), a disk drive unit 740, a signal generation device 750 (e.g., a speaker), and a network interface device 790.

The disk drive unit 740 may include a machine-readable medium 722 on which may be stored one or more sets of instructions (e.g., software) 724 embodying any one or more of the methodologies or functions described herein. The instructions 724 may also reside, completely or at least partially, within the main memory 770 and/or within the processor 760 during execution thereof by the machine 700, with the main memory 770 and the processor 760 also constituting machine-readable media. The instructions 724 may further be transmitted or received over a network 782 via the network interface device 790.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium capable of storing, encoding, or carrying a set of instructions for execution by the machine and that cause the machine to perform any one or more of the methodologies of the present technology. The term "machine-readable medium" shall accordingly be taken to include, but not be limited to, tangible media, including solid-state memories and optical and magnetic media.

Various embodiments related to implementing enhanced user interactions with a grid have been described. The embodiments may enable a user to edit one or more cells of the grid, have the content of the edited cells validated, and see additional information contextual to the grid rather than in separate forms. Although example embodiments have been described, it will be evident, after reading this disclosure that various modifications and changes may be made to these embodiments. Accordingly, the specification and drawings are to be regarded in an illustrative rather than a restrictive sense.

The abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A processor-implemented method comprising:
   generating a grid of a plurality of cells arranged in a number of rows and columns, each row corresponding to a data record of a database;
   displaying the grid on a display;
   for each row of the grid, displaying a selector icon on the display;
   in response to receipt of user-based input indicative of selection of a selector icon for one of the rows, visually expanding size of each cell in the one of the rows to indicate that the one of the rows has been selected for editing and visually altering appearance of each editable cell that contains editable content of the one of the rows to indicate that the editable content of each visually-altered editable cell is editable, and wherein, upon visual expansion of a selected row, each respective editable cell that is visually altered contains only the editable content contained when a respective row is selected until edited;
   receiving user-based input data for the at least some of the visually-altered editable cells of the one of the rows;
   validating the user-based input data using predefined criteria to identify incorrect input data; and
   displaying errors associated with the incorrect user-based input data.

2. The processor-implemented method of claim 1, further comprising receiving a user-based correction of the incorrect input data and storing the grid in the database after the user-based correction, unless incorrect input data is deleted.

3. The processor-implemented method of claim 1, wherein the user-based input data comprises new data or modification of displayed data.

4. The processor-implemented method of claim 1, further comprising displaying additional information describing proper user-based input data, for at least some of the visually-altered editable cells, the additional information being hidden in normal display of the grid.

5. The processor-implemented method of claim 1, further comprising displaying an edit-all icon to render all cells of the grid configured to receive the user-based input data as individually editable in response to a user-based activation.

6. The processor-implemented method of claim 1, wherein identifying comprises highlighting, and wherein the identifying of one or more cells as editable is based on a user-based selection.

7. The processor-implemented method of claim 1, further comprising storing the grid in response to receiving a user-based save command or after receiving user-based input data for one or more visually-altered editable cells.

8. The processor-implemented method of claim 1, further comprising displaying a hidden column when a user-based action to edit one or more cells of the hidden column is detected.

9. The processor-implemented method of claim 1, further comprising automatically sorting the rows of the grid after a new row is created and automatically sorting the columns of the grid after a new column is created.

10. A system comprising:
    memory to store a plurality of modules; and
    one or more processors coupled to the memory, the one or more processors configured to execute the plurality of modules including:
    a grid generator module executable to generate a grid of a plurality of cells arranged in a number of rows and columns, wherein each row corresponds to a data record of a database;

a display module executable to display the grid on a display wherein the display of the grid includes, for each row of the grid, a selector icon, wherein the display is configured to identify one or more cells of the plurality of cells as editable cells;

a communication module executable to:

receive user-based input indicative of selection of a selector icon for one of the rows, wherein the display module is further executable to, in response to selection the selector icon, visually expand the size of each cell in the one of the rows to indicate that the one of the rows has been selected for editing and visually alter appearance of each editable cell that contains editable content of the one of the rows to indicate that the editable content of each visually-altered editable cell is editable, and wherein, upon visual expansion of a selected row, each respective editable cell that is visually altered contains only the editable content contained when a respective row is selected until edited; and receive user-based input data for at least some of the one or more editable cells of the one of the rows; and a validation module executable to validate the user-based input data using predefined criteria to identify incorrect user-based input data, the display module executable to display errors associated with the incorrect user-based input data.

11. The system of claim 10, wherein the communication module is further executable to receive a user-based correction of the incorrect user-based input data and to store the grid in the database after the user-based correction, unless the incorrect user-based input data is deleted.

12. The system of claim 10, wherein the display module is further executable to display additional information that describes proper input data for at least some of the editable cells, the additional information being hidden in normal display of the grid.

13. The system of claim 10, wherein the display module is further executable to display an edit-all icon to render all cells of the grid configured to receive the user-based input data as individually editable in response to a user-based activation through the edit-all icon.

14. The system of claim 10, wherein the display module is further executable to identify one or more cells as editable, based on a user-based selection, and wherein the display module is further executable to identify the editable cells by highlighting.

15. The system of claim 10, wherein the display module is further executable to display a hidden column when a user-based action to edit one or more cells of the hidden column is detected.

16. The system of claim 10, further comprising a sorting module executable to automatically sort the rows of the grid after a new row is created in the grid through user-based input received through the communication module and automatically sort the columns of the grid after a new column is created in the grid through user-based input received through the communication module.

17. A non-transitory machine-readable medium comprising instructions, which when executed by one or more processors, perform a method comprising:

generating a grid of a plurality of cells arranged in a number of rows and columns, each row corresponding to a data record;

displaying the grid on a display, wherein one or more cells of the plurality of cells are editable cells;

for each row of the grid, displaying a selector icon on the display;

in response to receipt of user-based input indicative of selection of a selector icon for one of the rows, visually expanding size of each cell in the one of the rows to indicate that the one of the rows has been selected for editing and visually indicating which cells altering appearance of each editable cell that contains editable content of the one of the rows to indicate that the editable content of each visually-altered editable cell is editable, and wherein, upon visual expansion of a selected row, each respective editable cell that is visually altered contains only the editable content contained when a respective row is selected until edited;

receiving user-based input data for at least some of the editable cells of the one of the rows;

validating the user-based input data using predefined criteria to identify incorrect input data; and displaying errors associated with the incorrect user-based input data.

* * * * *